Aug. 4, 1931.   R. C. BOYDEN   1,816,891
UNIVERSAL JOINT
Filed March 30, 1929
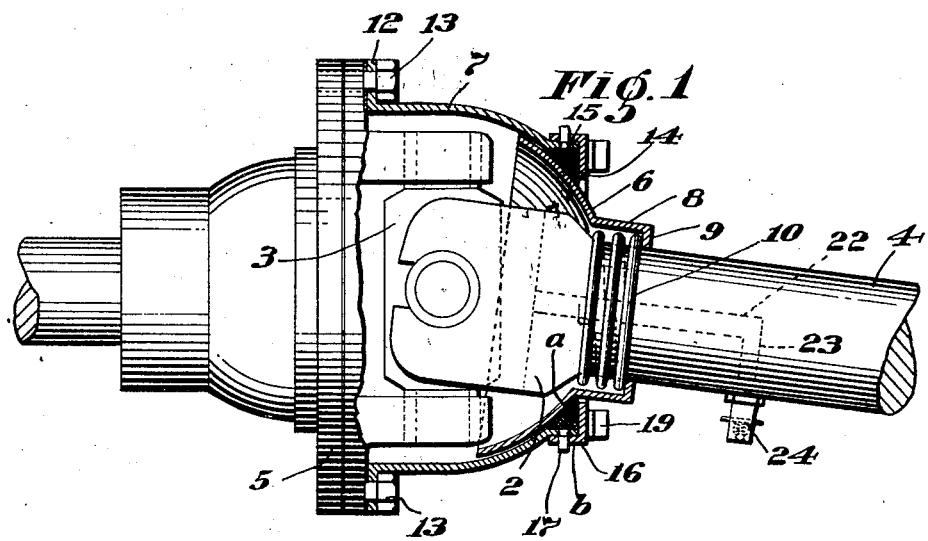
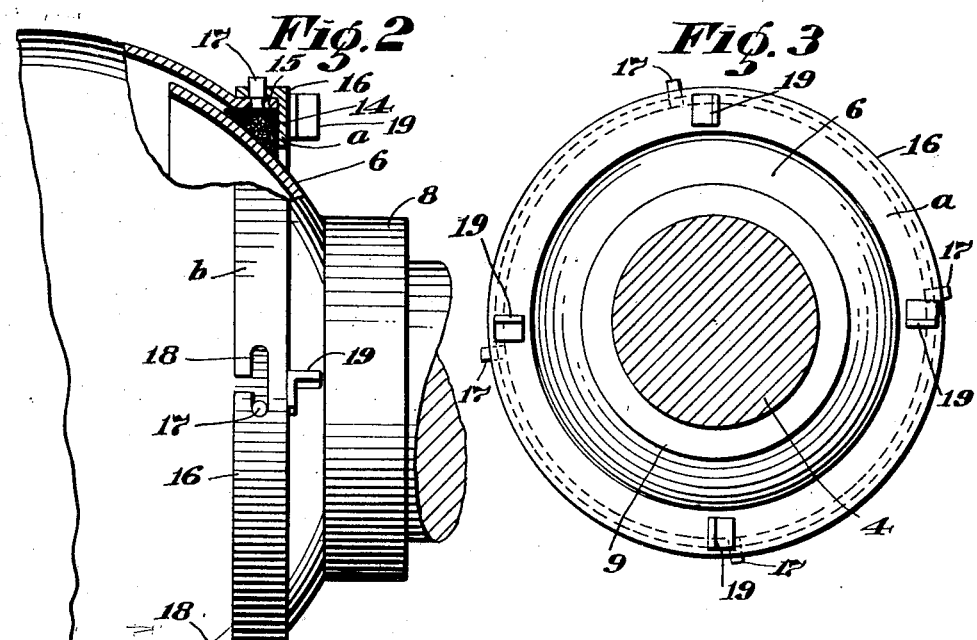
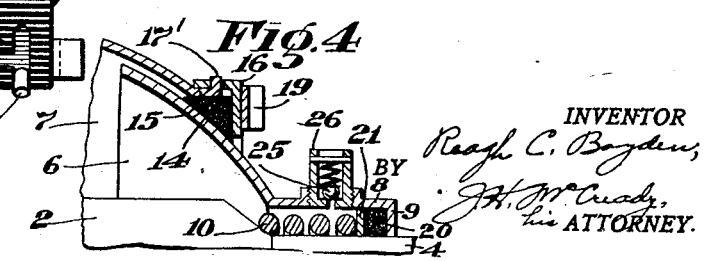

Patented Aug. 4, 1931

1,816,891

UNITED STATES PATENT OFFICE

REAGH C. BOYDEN, OF ATLANTIC, MASSACHUSETTS

UNIVERSAL JOINT

Application filed March 30, 1929. Serial No. 351,238.

This invention relates to universal joints and more especially to those used in motor vehicles.

Usually joints of this character are lubricated by a soft grease which is forced into the casing in which the joint is enclosed. Such a grease is at best a poor lubricator for the bearing surfaces of a universal joint, not because it lacks the necessary lubricating qualities, but because it is of such a consistency that it can only flow into the small clearances between the friction surfaces of the joint when it is in a melted condition. In addition to this the centrifugal action created in the joint during operation tends to throw the grease away from the bearing surfaces and out of the casing, with the result that the friction surfaces are robbed even of such lubricating value as the grease otherwise would afford.

It is clear that universal joints would be lubricated far more effectively with an oil, such for example as that used in differential or transmission mechanisms, but the use of a lubricant of this character requires a casing structure which will hold a body of oil in contact with the bearing surfaces notwithstanding the action of centrifugal force. The present invention deals with this problem and aims to devise a thoroughly satisfactory solution for it. It is also an object of the invention to devise a casing construction which will be more satisfactory than prior structures for use with lubricants of the character ordinarily used in universal joints.

The nature of the invention will be readily understood from the following description when read in connection with the accompanying drawings, and the novel features will be particularly pointed out in the appended claims.

In the drawings,

Figure 1 is a view, partly in side elevation and partly in section, of a universal joint and a casing therefor embodying features of this invention;

Fig. 2 is a side elevation of parts of the casing shown in Fig. 1, portions of the casing being broken away;

Fig. 3 is an end view of parts of the casing shown in Figs. 1 and 2, and

Fig. 4 is a fragmentary sectional view of a modified construction.

Referring first to Figs. 1, 2 and 3 the construction there shown comprises a universal joint of the common Spicer type. This joint includes members 2 and 3 mounted to swing about intersecting axes and to transmit motion from one to the other. In a motor vehicle the member 2 usually is driven by the propeller shaft 4, while the part 3 is carried by a yoke 5 which is connected to a short shaft carrying the driving pinion for the differential mechanism. This yoke may, however, be connected to any suitable driving or driven member, depending upon the use made of the joint structure.

The casing which encloses the joint members 2 and 3 comprises an inner member 6 and an outer member 7. These members have overlapping portions, each having the shape of a section of a sphere, one spherical section being slightly larger than the other, and both having a common center located at the intersection of the axes of the two members 2 and 3. The inner casing section 6 also has a sleeve portion 8 which encircles the driving shaft 4, and this sleeve terminates in a radially disposed collar portion 9 through which an aperture is formed large enough to receive the shaft 4. A coiled spring 10 encircles the shaft and abuts at one end against the joint member 2 and at its opposite end against the collar portion 9, thus tending to force the inner casing member 6 away from the joint members. The outer casing member 7 includes a marginal flanged portion 12 which is secured by bolts 13 to the member 5. This arrangement permits the two casing members to have a relative sliding movement in addition to their rotary motion in unison, and during such movement the spring 10 tends to hold the casing member 6 in contact with the inner surface of the outer member 7.

It is obviously impractical to try to make a tight joint directly between these members and without the aid of additional parts of some kind, and for this reason a packing 14 is provided to close the joint between these overlapping parts. Preferably this packing is of approximately triangular cross-sectional form, one face of the packing bearing on the outer spherical surface of the casing member 6, while another bears against the inner surface of a flange 15 which is formed at the smaller end of the outer casing member 7. The packing is held in this position by a retaining ring 16 of angular cross-sectional form. This ring includes a radially disposed flange a and a circumferential flange b, the latter closely encircling the flange 15 of the outer casing member, while the former backs up the packing 14 and holds it in place.

As the packing wears it becomes necessary after a time to renew it, and provision is therefore made for removing the ring 16 and releasing the packing. This may be done in several ways, but preferably the outer casing member and the ring are provided with parts cooperating to form a plurality of bayonet joints. As shown, the outer casing member 7 has several radially extending pins or studs 17 fixed in it and the flange b of the retaining ring 16 has a corresponding number of bayonet slots 18, each cooperating with its respective pin to secure the ring 16 releasably to the casing. Normally these parts occupy substantially the relationship shown in Fig. 2, but by rotating the ring 16 slightly the openings in the slots may be brought into alinement with the pins, after which the ring may be slipped off the casing member 7 in an axial direction. Preferably two or more lugs 19 are welded or otherwise secured to the ring 16 to facilitate the rotation of it.

After the ring has been removed, the packing may then be taken out, a new one substituted for it, and the ring replaced.

A packing of this character maintains a substantially oil tight joint between the two casing members 6 and 7. If grease is used in the casing, a construction such as that shown in Fig. 1 is satisfactory and is superior to the constructions heretofore employed for the reason that it provides a tight joint between the two casing members through which the grease, even if melted, cannot escape. Furthermore, the packing can be quickly renewed whenever necessary. It should also be noted that the inner casing member is so related to the outer member that centrifugal action tends to throw the grease away from the clearance space between the two casing members 6 and 7 instead of throwing it out through said space, as in the usual casing constructions.

If oil is to be used in the casing it is usually preferable to provide an additional packing to make a tight joint between the sleeve portion 8 of the inner casing member and the shaft 4. Such a packing is shown in Fig. 4 at 20. It is backed up by a washer 21 against which the spring 10 bears, the spring holding the packing compressed between the washer 21 and the collar portion 9 of the inner casing member and the shaft 4.

Oil, grease or other lubricant may be introduced into the casing through any usual or suitable filling or intake opening. A common arrangement is to drill a hole axially into the shaft 4, as shown at 22, Fig. 1, and then to drill a hole 23 transversely to meet the hole 22 and to thread a grease gun fitting 24 into the end of the hole 23, or a plug may simply be threaded into this hole to close it. When the grease is forced into the casing the air displaced by it will escape through the joint between the collar part 9 of the sleeve and the shaft 4. But if this joint is closed, as by the packing 20, Fig. 4, it becomes necessary to provide an additional vent for the air. For this purpose the vent valve shown in Fig. 4 is provided. The opening through this valve is closed normally by the spring pressed ball 25 supported in the valve body 26, this body being threaded into the sleeve 8. Due to the fact that this vent is located closely adjacent to the axis of rotation of the universal joint where centrifugal force necessarily is very small, there is only a very slight tendency for the lubricant to unseat the valve 25. It can be unseated, however, by the air displaced by the filling of the casing with lubricant, this operation being performed under considerable pressure.

In the arrangement shown in Fig. 4 lugs 17' are struck up from the material of the flange 15 of the outer casing and perform the same functions as the pins 17 in the arrangement above described.

The invention thus provides a universal joint construction which can be used with either oil or grease to prevent the escape of the lubricant from the casing. In addition, it provides an entirely practical construction for holding a body of lubricating oil in contact with the friction surfaces of the joint, which result has not, so far as I am aware, been accomplished heretofore. The ease with which the packing 14 can be renewed is a very important practical advantage.

While I have herein shown and described a preferred embodiment of my invention, it will be understood that the invention will be embodied in other forms without departing from the spirit or scope thereof.

Having thus described my invention, what I desire to claim as new is:

1. In a universal joint comprising two joint members movable in different directions about a common center, a casing comprising an inner casing member, and outer casing member having a part encircling and overlapping the margin of said inner member, a packing for closing the joint between said casing members, a retaining ring for holding said packing pressed against the outer surface of said inner casing member, and means carried by said outer casing member for releasably holding said ring in its operative position, said means being constructed to permit the removal of said ring to release said packing.

2. A casing for a universal joint comprising two casing members supported in overlapping relationship, one of said members being mounted for limited sliding movement relatively to the other, a packing for closing the joint between said members, and means for holding said packing in its operative position, said means being operable to release the packing while said casing members remain in their normal cooperative relationship to each other.

3. A casing for a universal joint comprising two casing members, each including a portion having approximately the shape of a section of a sphere, said portions being mounted in overlapping relationship and one of said members being supported for limited movement about the center of the joint with reference to the other member, a packing for closing the joint between said members, a retainer for holding said packing in its operative position, and means for releasably securing said retainer it its operative relationship to said casing.

4. A casing for a universal joint comprising two casing members supported in overlapping relationship, one of said members being mounted for limited sliding movement relatively to the other, a packing for closing the joint between said members, a retaining ring for holding said packing in its operative position, and parts on said casing with which said ring has releasable engagement for holding the ring in its operative position.

5. A casing for a universal joint comprising two casing members supported in overlapping relationship, one of said members being mounted for limited sliding movement relatively to the other, a packing for closing the joint between said members, a retaining ring for holding said packing in its operative position, said ring and casing being constructed to have a bayonet joint engagement with each other whereby the ring may be released from said casing to permit the removal of the packing.

REAGH C. BOYDEN.